United States Patent [19]

Elias

[11] Patent Number: 4,491,596

[45] Date of Patent: Jan. 1, 1985

[54] METHOD FOR PREPARING AERATED GUM CONFECTION

[75] Inventor: Ronald J. Elias, Mount Laurel, N.J.

[73] Assignee: Fleer Corporation, Philadelphia, Pa.

[21] Appl. No.: 488,630

[22] Filed: Apr. 26, 1983

[51] Int. Cl.³ ............................ A23G 3/00; A23G 3/30
[52] U.S. Cl. ............................................. 426/5; 426/3; 426/660
[58] Field of Search ....................... 426/5, 3, 572, 660

[56] References Cited

U.S. PATENT DOCUMENTS

| | | | |
|---|---|---|---|
| 2,290,120 | 7/1942 | Thomas | 99/135 |
| 2,460,698 | 2/1949 | Lindhe | 426/5 |
| 2,559,648 | 7/1951 | Lindhe | 426/5 |
| 3,020,164 | 2/1962 | Forkner | 99/134 |
| 3,262,784 | 7/1966 | Bucher | 99/135 |
| 3,912,817 | 10/1975 | Saposwitz | 426/5 |
| 4,000,321 | 12/1976 | Mochizuki et al. | 426/5 |
| 4,233,319 | 11/1980 | Fritz et al. | 426/3 |

*Primary Examiner*—Jeanette Hunter
*Attorney, Agent, or Firm*—Dann, Dorfman, Herrell and Skillman

[57] ABSTRACT

An aerated gum confection having unique and desirable shape, texture and chewing characteristics is produced by preparing a plastic semi-solid candy mass, mixing the candy mass with a gum base and other desirable flavoring and coloring additives to form a generally homogeneous batch material thereof, forming the batch material into discrete bits and subjecting the bits to a vacuum environment, with simultaneous cooling, to expand the bits into an aerated gum confection.

14 Claims, 1 Drawing Figure

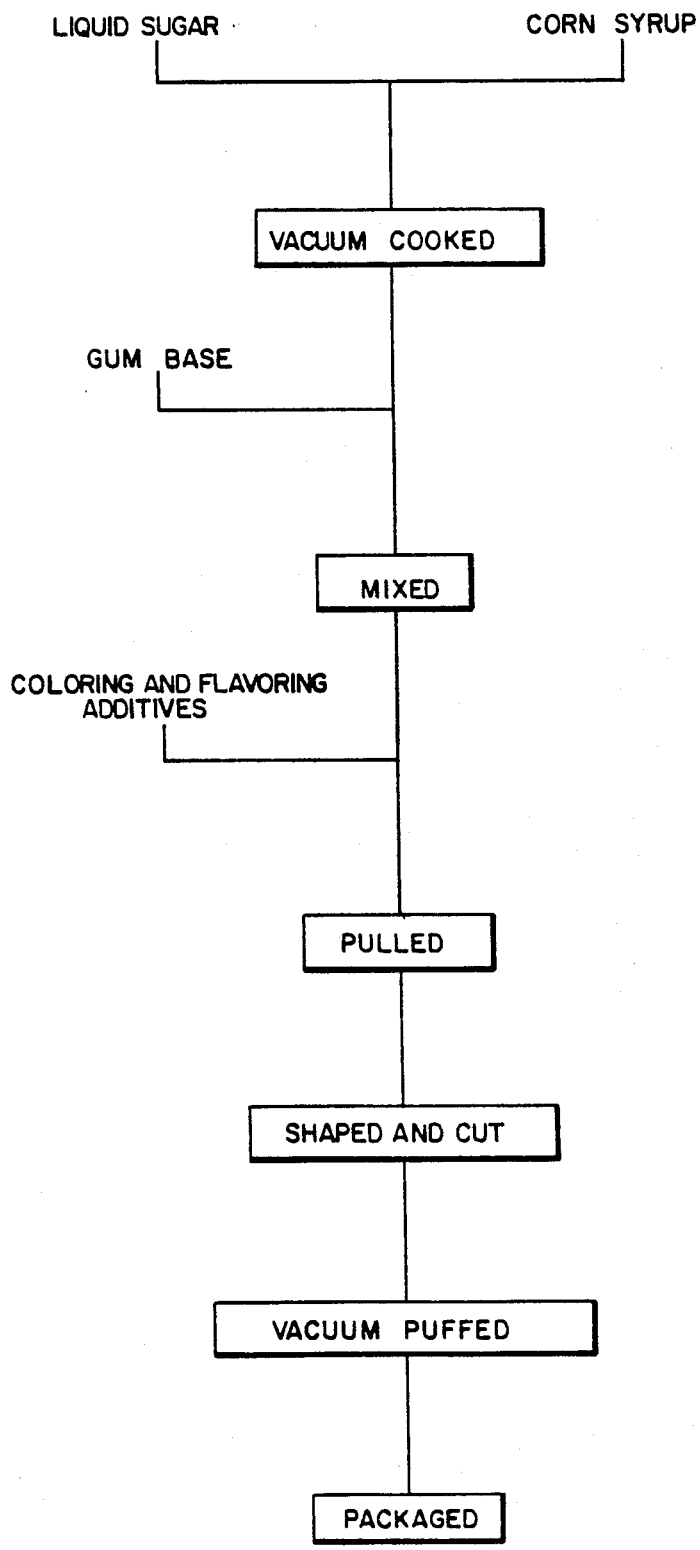

METHOD FOR PREPARING AERATED GUM CONFECTION

FIELD OF THE INVENTION

The present invention relates to an aerated gum confection and process for making the same.

BACKGROUND OF THE INVENTION

Chewing gums are conventionally prepared from ingredients including sugar, gum base, corn syrup, color and flavoring. The gum base is typically heated and combined while hot with the other ingredients in a suitable mixer, with or without the addition of supplemental agents which produce desired modifications of texture, chewing characteristics and the like. The material discharged from the mixing vessel is a tough, taffy or dough-like mass which is passed through rolls and sheeting and scoring machines, or extruded, sized and cut, in accordance with practices well known in the art, to produce the final chewing gum product.

The final chewing gum product described above normally contains about 3-5% by weight of moisture. It is believed that due to a synergistic effect of combining liquid sugar and corn syrup with gum base, these products may result in having a bitter flavor or taste.

Over the years, there have also been developed a variety of processes for producing chewing gum which is light weight and low in specific gravity and which gives a soft chewing sensation when chewed. One such method involves mixing foaming agents with the chewing gum composition in the presence of water, and heating the mixture to a temperature in the range of from 110° C. to 160° C. This method also tends to harm the desired flavor and taste of the chewing gum products. In another method for preparing aerated chewing gum, a foaming agent and a gelatin are mixed with chewing gum base which has been foamed. The disadvantage of using foaming agents and gelatin is the inability to obtain a chewing gum product having good flavor and taste. Another disadvantage with processes which involve the use of foaming agents is that in order to obtain an aerated candy gum having desirable homogeneous texture, the degree of foaming must be accurately controlled by maintaining operating conditions, such as temperature, etc., at a precise level, which, as a result, renders quality control difficult.

A still further method of preparing a low density chewing gum product comprises formulating a chewing gum composition into a liquid batch, whipping the batch (preferably under an inert atmosphere) to gassify it, pouring the gassified mass into molds of a predetermined shape, subjecting the gassified mass while in the mold to vacuum to expand the gassified mass to conform to the shape of the mold and maintaining the vacuum (typically for about 24 hours) until the expanded gassified batch in the mold becomes shape-retaining at ambient conditions of temperature and pressure. A particular disadvantage of this method is the length of time which the gassified mass in the mold must be subjected to vacuum to obtain a shape-retaining product. As mentioned above, the vacuum must be maintained for approximately 24 hours to obtain the desired product. Another disadvantage is the need for special equipment to carry out gasification under an inert atmosphere in order to reduce the amount of oxidative deterioration. These disadvantages, and indeed diseconomies, weigh against production of such aerated chewing gum products on a commerical scale.

SUMMARY OF THE INVENTION

In accordance with the present invention there is provided an economical process for preparing an aerated gum confection having unique and desirable shape, texture and chewing characteristics. The process comprises preparing a plastic, semi-solid candy mass having a relatively low moisture content, mixing the candy mass with a gum base to provide a batch material containing, by weight, about 70-92% candy mass to about 8-30% gum base, forming the batch material into discrete bits of predetermined shape and size and subjecting the bits thus formed to a vacuum environment, with simultaneous cooling of the bits, in order to expand the bits into an aerated gum confection.

As compared with prior art methods for producing low density chewing gum or gum candy products, the process of the present invention may be practiced without the need for maintaining precise operating conditions and without excessive capital or operating costs. In particular, in the process of the present invention, there is no need for maintaining precise temperatures nor is there any need for carrying out a distinct gassifying step under an inert atmosphere. In addition, no molds are necessary in order to produce the gum confection of the present invention, which is preferably generally global in final shape, and the time during which the desired form must be subjected to a vacuum environment to produce the final product is minimal. Reduced vacuum time is possible since the cooked candy mass comprising liquid sugar or a derivative thereof and corn syrup or a derivative thereof has a moisture content substantially lower than the batch material generally used in the above-described prior art processes. Hence, there is a distinct economical advantage to eliminating moisture by vacuum during processing of the batch material and thereafter expanding a substantially drier material, as opposed to eliminating moisture from individual units of moist batch material during expansion and final processing. It is believed that using a batch material of reduced moisture content also reduces the bitter taste which may result from the synergistic effect of combining high moisture content ingredients such as liquid sugar and corn syrup with gum base. These factors are significant from the standpoint of application of the invention of a commerical scale to provide a marketable product.

BRIEF DESCRIPTION OF THE DRAWING

The foregoing summary as well as the following detailed description of the preferred embodiment of the present invention will be better understood when read in conjunction with the accompanying drawing, in which the FIGURE is a block diagram of a process embodying the present invention for producing an aerated gum confection.

DETAILED DESCRIPTION OF THE INVENTION

Referring now to the drawing, the present invention contemplates a economical process for producing an aerated gum confection having unique and desirable shape, texture and chewing characteristics.

The process for producing the aerated gum confection of the present invention is diagramatically illustrated in the FIGURE and includes the step of cooking liquid sugar or a derivative thereof and corn syrup or a derivative thereof to form a plastic, semi-solid candy mass. It is preferable to vacuum cook the candy mass to more readily substantially reduce the moisture content. Reduction of moisture at this point helps to prevent final bitter flavor and taste problems and substantially reduces vacuum expansion time which occurs later in the process. The candy mass is initially mixed with a gum base to produce a batch material having the following proportions by weight: about 70-92% candy mass to about 8-30% gum base. This mixture is then worked, under conditions which cause incorporation of air in the batch material, such as by kneading and/or pulling, and a generally homogeneous mixture of the candy mass and gum base is formed. Flavoring and/or coloring additives may be added, if desired, during the working of the mixture. The homogeneous mixture is thereafter formed into bits of predetermined shape and size, which are preferably bite-size bits. The bite-size bits are then cooled while subjected to a vacuum environment to expand the bits into a desired shaped product, which product may be packaged for marketing to consumers.

Any of a variety of sugars, such as dextrose, glucose, fructose and sucrose, etc., may be used as the liquid sugar component in practicing the present invention. The liquid sugar is combined with corn syrup (referred to in the prior art as "doctoring") in approximately equal amounts. Doctoring prevents undesirable hardening of the sugar component.

The plastic semi-solid candy mass used in the process of the present invention may be provided by any of the well known methods known to those skilled in the art but is best provided by vacuum cooking the liquid sugar and corn syrup combination at a temperature in the range of 212°-330° F. for a time sufficient to reduce the moisture content thereof preferably to less than about 4%. Lowering the moisture content of the sugar and syrup combination in this manner, as mentioned above, helps prevent bitter flavor and taste problems in the final product and minimizes the time the bite-size bits must be subjected to vacuum to produce the final gum confection. Typically, in order to reduce the moisture content to the desired level, the combination of liquid sugar and corn syrup is preferably vacuum cooked at the above-noted temperature range for about 5 to 30 minutes. Of course, it should be appreciated that the combination of sugar and syrup could be cooked in an open fired cooker, but it would require a higher temperature and longer cooking time to obtain the preferred moisture removal.

If a substantially sugar-free product is desired, the liquid sugar and corn syrup components may be replaced by liquid substitutes therefor. In particular, the liquid sugar substitute may be sorbitol or mannitol and the corn syrup substitute may be a sorbitol solution. It is anticipated that still other liquid sugar substitutes and corn syrup substitutes may advantageously be employed in providing the plastic, semi-solid candy mass and will result in the production of an aerated gum confection having equally unique and desirable shape, texture and chewing characteristics. It is noted that, when employing artificial sweeteners as the liquid substitutes, the temperature range for cooking the components would be somewhat different, depending on the proportions of the components, than the range when cooking liquid sugar and corn syrup.

After the cooking of the liquid sugar thereof and corn syrup or liquid substitutes therefor is completed, the resulting hot candy mass is then combined with a gum base in the following proportion by weight: about 70-92% candy mass to about 8-30% gum base to form a homogeneous mixture thereof. Any semi-soft stick or bubble-type gum base may be used in providing the mixture. The mixture is best formed by initially mixing the hot candy mass and gum base for about 2 minutes in a conventional mixer, such as a Berks mixer (a table with plungers and arms which knead the components together). The initial mixture, cooled to a temperature of about 180°-185° F., is thereafter further worked, preferably by being pulled on a conventional pulling machine for about 3 minutes to form a generally homogeneous mixture. During pulling, air is consequently incorporated into the mixture, which mixture, upon sizing, cutting and vacuum expanding results in the aerated gum confection of the present invention. In the preferred process described above, the mixture is substantially homogeneous throughout, which is desirable in the final product. If flavoring and coloring additives are to be incorporated into the mixture, they are best admixed during the working or pulling operation and are added in the following proportion by weight: about 95-99.9% mixture of candy mass and gum base to about 0.1-5% additives.

The substantially homogeneous mixture, further cooled to a temperature of about 165° F., is formed into a predetermined shape and thereafter sized into bite-size bits. The shaping and sizing may be achieved by feeding the mixture through conventional apparatus known to those skilled in the art. One such apparatus used for shaping is a batch roller with sizer. When feeding the homogeneous mixture of the present invention through such a batch roller, the rollers should be heated to maintain the temperature of the mixture at high 150°-160° F. to prevent crystallization of the entire mass of individual components thereof. Many batch rollers with sizers, such as Hansella and Latini machines are capable of sizing, and shaping confections and may be adapted to have a cutting operation to size the shaped mixture into bite-size bits. Of course, the sizing or cutting of the shaped mixture into bite-size bits may be performed in any conventional manner.

The bite-size bits are immediately thereafter subjected to a vacuum environment to expand the bits into an aerated gum confection about 4 times the size of the bits with a resulting density of about 0.5 g/cc. The temperature of the bits entering the vacuum ranges from about 145°-155° F. The vacuum need only be maintained for about 2-3 minutes due to the substantially reduced moisture content resulting from vacuum cooking the liquid sugar and corn syrup. A preferred mode of vacuum expanding the bits involves passing the bits through a vacuum tunnel, such as a Stokes vacuum tunnel manufactured by Pennwalt Corporation of Philadelphia, Pa. More specifically, after the mixture is shaped and cut, the bits are fed onto to a conveyor belt which carries the bits into a star valve and thereafter through the vacuum tunnel. A vacuum of about 20-30 mmHg is adequate to achieve the desired end-product in the 2-3 minutes the bits are subjected to the vacuum environment. The aerated gum confection leaves the vacuum tunnel at a temperature of about 80°-85° F. and, preferably are shaped in a natural substantially round or globe-shape and may be packaged immediately or allowed to cool to room temperature prior to packaging.

The following example describes the preparation of an aerated gum confection having unique and desirable shape, texture and chewing characteristics in accordance with the present invention, and sets forth the best mode contemplated for carrying out the invention, but is not to be construed as limiting the invention.

EXAMPLE 1

A 50 pound mixture of liquid sugar and corn syrup was heated in a vacuum cooker to a temperature of about 230° F. and cooked under vacuum for 5 minutes to form a plastic semi-solid candy mass. The candy mass was thereafter mixed in a Berks Mixer with 7.5 pounds of gum base for 2 minutes. The temperature of the initial mixture was approximately 180°-185° F. The initial mixture was combined with about 2 ounces of coloring and flavoring additives and pulled on a pulling machine for 3 minutes to form a generally or substantially homogeneous mixture of the candy mass, gum base and additives. The generally homogeneous mixture was sized and shaped on a Latini batch roller with sizer, the rollers of the machine being maintained at a temperature of about 160° F. to prevent crystallization of the entire mass or individual components of the homogeneous mixture. The shaped mass was cut into bite-size bits and the bits were thereafter fed onto a conveyor belt of a Stokes vacuum tunnel through a star valve and subjected to the vacuum environment for 2½ minutes to expand the bits into a substantially globe-shaped product. The globe-shaped product was cooled to room temperature and thereafter packaged.

From the foregoing description, it can be appreciated that the present invention provides a method and employs apparatus for efficiently preparing an aerated gum confection, which has desirable shape, texture, taste and chewing characteristics. It will be recognized by those skilled in the art that changes and modifications may be made to the above-described process without departing from the broad inventive concepts of the invention. It is understood, therefore, that this invention is not limited to the particular process or embodiment described, but it is intended to cover all changes and modifications which are within the scope and spirit of the invention as defined in the appended claims.

What is claimed is:

1. A process for producing an aerated gum confection which process comprises the steps of:
   (a) preparing a plastic semi-solid candy mass by cooking a mixture consisting essentially of liquid sugar and corn syrup or liquid substitutes therefor, while reducing the moisture content of said candy mass to produce a plastic semi-solid;
   (b) preparing a batch material, consisting essentially of said semi-solid candy mass and a gum base by mixing about 70-92 percent of said candy mass and about 8-30 percent of said gum base;
   (c) aerating said batch material;
   (d) forming said aerated batch material into discrete bits of predetermined size and shape; and
   (e) subjecting said bits to a vacuum environment while simultaneously cooling said bits, thereby expanding said bits to provide an aerated gum confection.

2. The process of claim 1, wherein said plastic semi-solid candy mass is prepared by heating substantially equal amounts of said liquid sugar and corn syrup or liquid substitutes therefor at a temperature in the range of 212°-330° F. for a time sufficient to substantially reduce the moisture content thereof.

3. The process of claim 2, wherein said liquid sugar and corn syrup or liquid substitutes therefor are heated under vacuum at said temperature range for about 5 to 30 minutes.

4. The process of claim 1, wherein said batch material is prepared by initially mixing said candy mass and gum base and thereafter working said initial mixture to form a generally homogeneous mixture.

5. The process of claim 4, wherein said candy mass and gum base are initially mixed for about 2 minutes.

6. The process of claim 4, wherein said initial mixture of candy mass and gum base is worked by pulling said mixture for about 3 minutes to form said homogeneous mixture.

7. The process of claim 4, including admixing with said homogeneous mixture of candy mass and gum base a predetermined amount of coloring and flavoring additives in the following proportion by weight: about 95-99.9% homogeneous mixture of said candy mass and gum base to about 0.1-5% additives.

8. The process of claim 7, wherein said additives are admixed with said mixture of candy mass and gum base during working.

9. The process of claim 1, wherein said forming step includes feeding said mixture through a batch roller with sizer.

10. The process of claim 1, wherein said bits are subject to said vacuum environment for about 2-3 minutes.

11. A process for producing an aerated gum confection which process comprises the steps of:
   (a) preparing a semi-solid candy mass consisting essentially of approximately equal amounts of liquid sugar and corn syrup by heating said liquid sugar and corn syrup under vacuum at a temperature in the range of 212°-330° F. for a time sufficient to substantially reduce the moisture content thereof;
   (b) preparing a batch material consisting essentially of, by weight of said batch material, about 70 to 92 percent candy mass, about 8-30 percent gum base, coloring and flavoring additives by mixing said candy mass and said gum base for about 2 minutes, admixing therewith said coloring and flavoring additives in an amount of from 0.1 to about 5 percent by weight of said batch material, and working said batch material for about 3 minutes to incorporate air and to provide a homogeneous blend;
   (c) feeding said aerated batch material through a batch roller and sizing means to form discrete bits of predetermined shape and size; and
   (d) subjecting said bits to a vacuum environment for about two to three minutes while simultaneously cooling said bits, thereby expanding said bits to provide an aerated gum confection.

12. The process of claim 11, wherein said bits in step (c) are bite-size bits.

13. An aerated gum confection product made by the process of claim 12.

14. An aerated gum confection produced by the steps of:
   (a) preparing a plastic semi-solid candy mass by cooking a mixture consisting essentially of liquid sugar and corn syrup or liquid substitutes therefore, while reducing the moisture content of said candy mass to produce a plastic semi-solid;
   (b) preparing a batch material, consisting essentially of said plastic semi-solid candy mass and a gum base by mixing about 70–92 percent of said candy mass and about 8–30 percent of said gum base;
(c) aerating said batch material;
(d) forming said aerated batch material into discrete bits of predetermined size and shape; and
(e) subjecting said bits to a vacuum environment while simultaneously cooling said bits, thereby expanding said bits to provide an aerated gum confection.

* * * * *

UNITED STATES PATENT AND TRADEMARK OFFICE
CERTIFICATE OF CORRECTION

PATENT NO. : 4,491,596
DATED : January 1, 1985
INVENTOR(S) : Ronald J. Elias

It is certified that error appears in the above-identified patent and that said Letters Patent is hereby corrected as shown below:

Column 4, line 37, "high" should be --about--.

Column 4, line 38, "of" should be --or--.

Signed and Sealed this

Seventh Day of May 1985

[SEAL]

*Attest:*

DONALD J. QUIGG

*Attesting Officer*     *Acting Commissioner of Patents and Trademarks*